United States Patent [19]

Becker et al.

[11] Patent Number: 5,419,483
[45] Date of Patent: May 30, 1995

[54] METHOD AND APPARATUS FOR MANUFACTURING A PRINTED CIRCUIT CARD AND CONNECTOR ASSEMBLY

[75] Inventors: Darryl J. Becker; Brian B. Hanson, both of Rochester; Donald E. Hora, Byron; James L. Peacock, Rochester, all of Minn.

[73] Assignee: International Business Machines Corporation, Armonk, N.Y.

[21] Appl. No.: 248,990

[22] Filed: May 25, 1994

Related U.S. Application Data

[62] Division of Ser. No. 42,947, Apr. 5, 1993, Pat. No. 5,318,212.

[51] Int. Cl.⁶ .............................................. B23K 31/02
[52] U.S. Cl. ................................ 228/212; 228/180.21; 29/829; 29/831
[58] Field of Search ................. 228/179.1, 180.21, 212, 228/44.3, 44.7, 47; 211/41; 439/377; 29/829, 831, 423, 462, 559

[56] References Cited

U.S. PATENT DOCUMENTS

| | | | |
|---|---|---|---|
| 3,939,382 | 2/1976 | Lacan et al. | 211/41 |
| 4,167,032 | 9/1979 | Scagnelli | 361/415 |
| 4,403,408 | 9/1983 | Koppensteiner et al. | 29/764 |
| 4,872,853 | 10/1989 | Webster | 439/327 |
| 5,013,264 | 5/1991 | Tondreault | 439/741 |
| 5,067,648 | 11/1991 | Cascini | 228/47 |

Primary Examiner—Samuel M. Heinrich
Attorney, Agent, or Firm—J. Michael Anglin

[57] ABSTRACT

Assembling a circuit card to a straddle mount connector with improved alignment. A holder using a parallel linkage holds the card parallel to the connector despite thickness variations, during solder bonding.

4 Claims, 2 Drawing Sheets

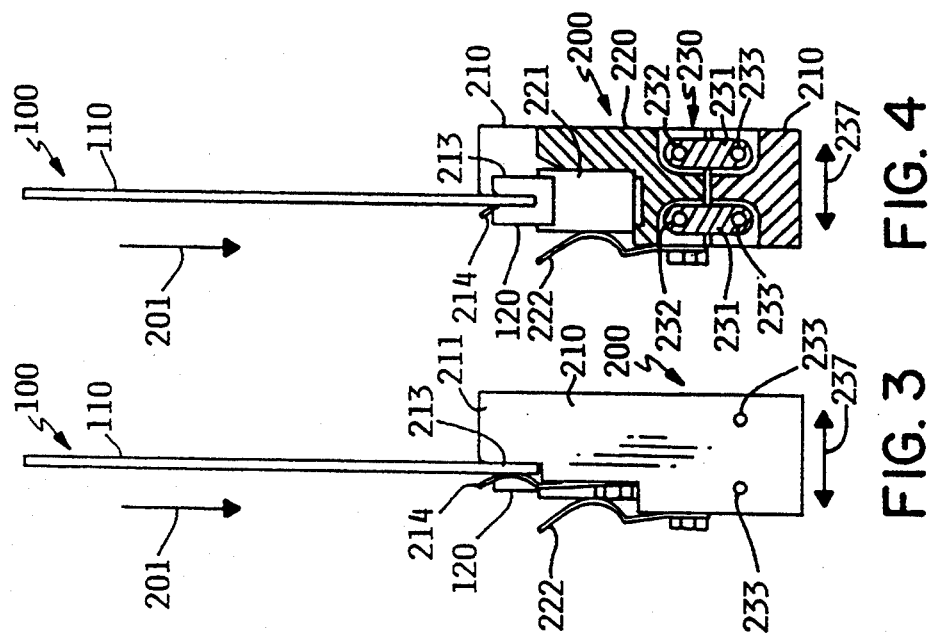
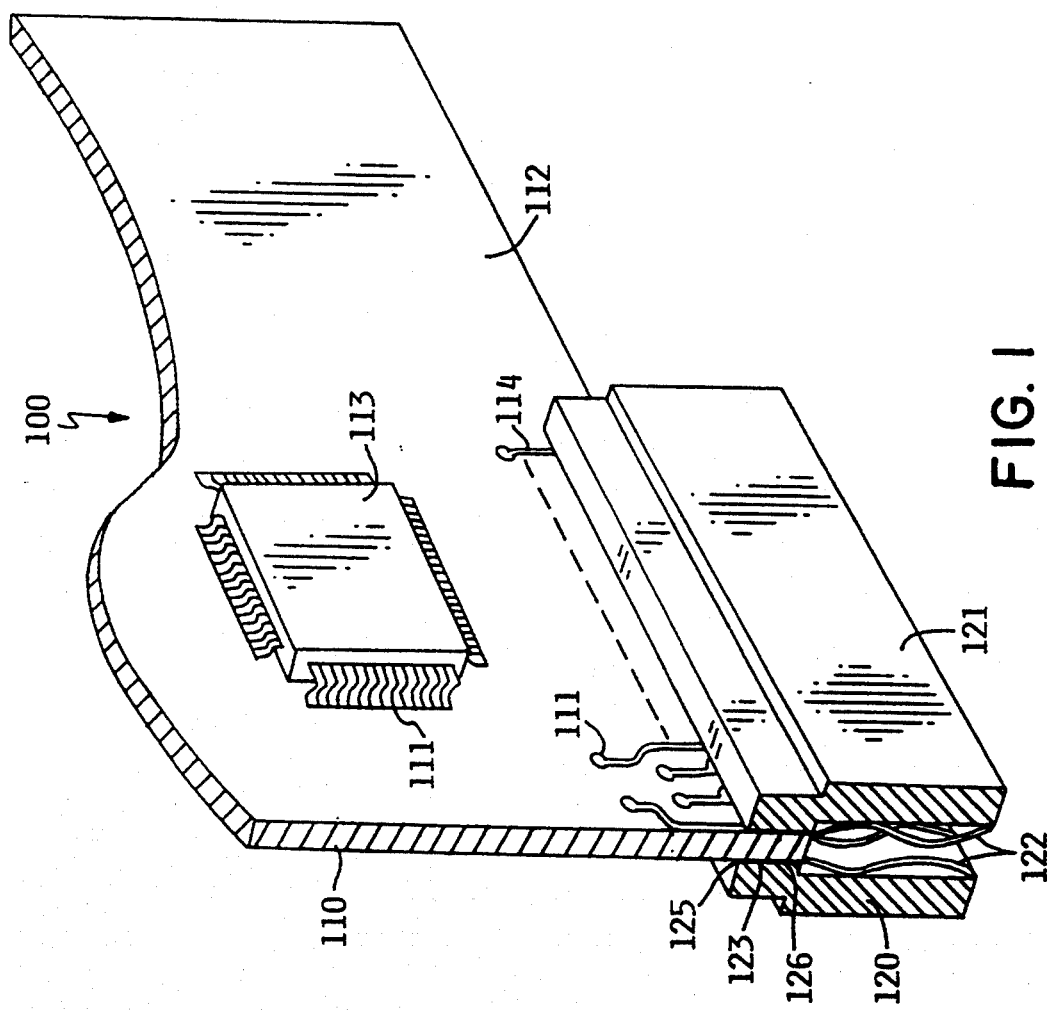

METHOD AND APPARATUS FOR MANUFACTURING A PRINTED CIRCUIT CARD AND CONNECTOR ASSEMBLY

CROSS REFERENCE TO RELATED APPLICATIONS

This is a divisional of application Ser. No. 08/042,947, filed on Apr. 5, 1993, now U.S. Pat. No. 5,318,212.

BACKGROUND OF THE INVENTION

The present invention relates to the fabrication of electronics circuit cards, and more particularly concerns aligning such a card with a connector during assembly thereof.

Many printed circuit cards or boards are attached to long, multicontact connectors to provide an assembly which can be releasably mounted on a larger unit, such as a computer backplane. For this and other applications, a circuit card must be mechanically properly aligned with its connector so as to allow the assembly to fit into the larger unit. For example, card guides in the larger unit are often used to hold card assemblies in place; in midrange computers, card assemblies are mounted into covers or "books" which slide into a cage where the connector engages a bus socket.

The primary alignment criterion for an assembly is the angle between the surfaces of the card holding the electronics components and one or more sides of the connector. If the connector sides are cocked or nonparallel to the card surfaces in a computer card, for example, the pins of the backplane socket will not engage the conductors on the connector as one attempts to lower the card into its guides: the card might not fit at all; some of the connector conductors might not make contact with their mates in the socket; the socket conductors might become bent, making the socket unusable with other cards subsequently pushed into the same slot; or the connector conductors might become bent, rendering the card unusable in other backplane slots.

A conventional solution to the alignment problem is to provide an alignment surface on the connector which fits against one of the surfaces of the card. Clamping the two pieces together while the card conductors are reflow soldered to the connector conductors then assures that the angular alignment between card and connector is proper.

For certain assemblies, however, it is difficult or impossible to use this direct method. For example, circuit cards having surface-mount components on both surfaces must frequently be assembled to straddle-mount connectors having contacts engaging pads on both sides of the card. This type of assembly is used, for example, in personal computers having Microchannel Architecture (tm) backplanes.

This type of assembly could be manufactured in conventional ways with a holding tool for engaging an area of one side of the card and also one side of the connector. However, this would require either very expensive cards and connectors having extremely close thickness tolerances, or laborious manual adjustment of each assembly during manufacture to compensate for thickness variations of individual components.

SUMMARY OF THE INVENTION

The present invention provides for the manufacture of assemblies having a precise angular relationship between an electronics card and a connector, without requiring great accuracy in the mechanical tolerances of the card or connector.

The invention provides a low-cost method using conventional reflow soldering techniques for assembling a circuit card to a connector, and particularly to a straddle-mount connector.

The invention also provides a low-cost mechanical holder or jig for manufacturing such an assembly.

Briefly, the invention assembles a connector to a circuit card at a fixed angle by holding a connector flat side against a first flat surface of a first block of a separate holder, holding a circuit card flat side against a second flat surface on a second block of the holder which is constrained to move parallel to the first block, mating the connector to said circuit card so as to maintain a spatial relationship between the blocks such that the circuit card remains at a fixed angle (e.g., parallel) to the connector flat side despite dimensional variations in the connector and in the circuit card in a direction perpendicular to their sides. Then, a bond is formed between the connector and the circuit card while they are mated, so as to produce a mechanically rigid assembly of the connector and the circuit card accurately aligned to each other. A holder for implementing this assembly has the two blocks described above coupled to each other by a parallel linkage, and is provided with spring clips for holding the card and connector to the flat surfaces of the respective blocks.

BRIEF DESCRIPTION OF THE DRAWING

FIG. 1 is an isometric view, partially broken away, of a printed circuit card and connector assembled according to the invention.

FIG. 3 is an end view of the holder of FIG. 2, shown including the card and connector assembly of FIG. 1.

FIG. 4 is a sectional view of the holder of FIG. 2, taken along the line 4—4 of FIG. 2, including the assembly of FIG. 1.

DESCRIPTION OF A PREFERRED EMBODIMENT

Figure 2:
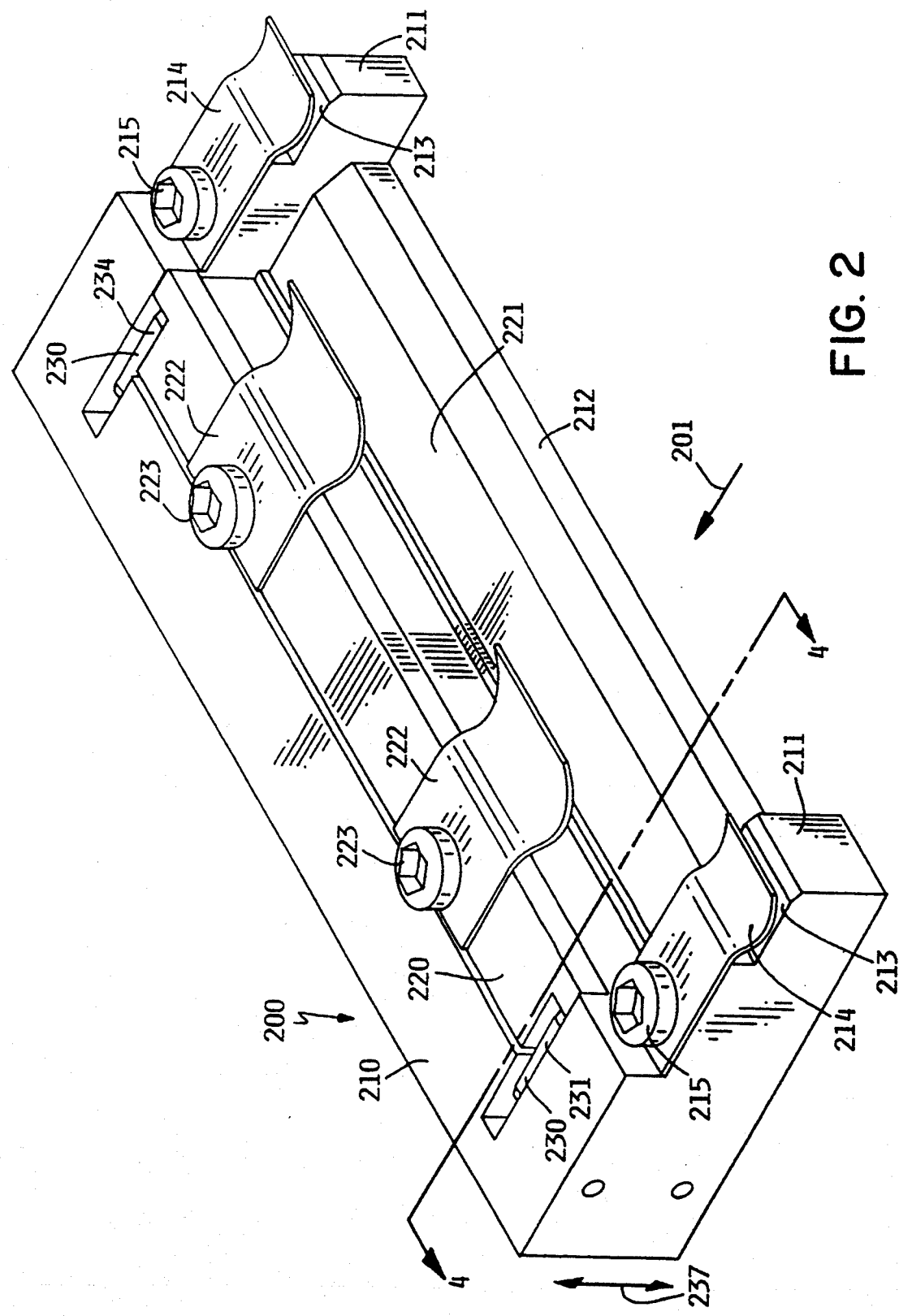
FIG. 2 is an isometric view of a holder according to the invention for use in assembling the card and connector of FIG. 1.

FIG. 1 shows a part of an assembly 100 of a printed-circuit card or board 110 and a straddle-mount connector 120. Conventional card 110 has a number of electrical conductors such as 111 on surface 112, and has a number of components such as integrated-circuit modules 113. Portions 114 of conductors 111 are tinned with solder. Card 110 also normally has a number of interior layers also carrying electrical conductors, not shown. Lower edge 114 of card 110 fits into connector 120. The example shown is for use in a personal computer.

Connector 120 is of the type called a 'straddle mount' connector in the art. Sides 121 are flat surfaces, but the thickness w between them can vary as much as 1.5 mm for a 12 mm wide connector, for connectors of different lots and different manufacturers. Electrically conductive spring-wire contacts 122 fit into a lower slot 123. A portion 125 of each contact 122 extends upwardly through an upper slot 126, where it is solder-bonded to a conductor portion 114 on printed circuit card 110. The thickness of a typical card 110 might vary between 1 mm and 2 mm (i.e., 100%) for different numbers of wiring layers on the card and different card materials.

FIG. 2 is an isometric front view of a holder 200 according to the invention. FIG. 3 is an end plan of holder 200, and FIG. 4 is a sectional view taken along line 4—4 of FIG. 2. FIGS. 3 and 4 show an assembly 100, FIG. 1, mounted in block 200; for clarity, the assembly has been removed from FIG. 2.

Holder 200 comprises two blocks of high-temperature phenolic plastic, a first block 210 and a second block 220. Block 210 has end areas 211 which extend beyond block 220, and a middle section 212. End areas 211 each have a flat surface extending thereacross, to form a coplanar flat surface 213 capable of receiving circuit card 110. A spring clip 214 on each surface 213 is fastened to block 210 by a screw 215. As shown most clearly in FIG. 3, these spring clips 214 urge circuit card 110 into engagement with surfaces 213 so as to hold the card parallel thereto—that is, at a predetermined angle of zero degrees to surface 213.

Block 220 includes a flat surface 221. This surface is of a size sufficient to receive connector 120 of assembly 100. Spring clips 222, fastened to block 220 by screws 223, urge connector 120 into engagement with flat surface 221 so as to hold the connector parallel thereto, with its side 121 at an angle of zero degrees, as shown most clearly in FIG. 4.

Parallel linkage 230 is a four-bar arrangement for maintaining blocks 210 and 220 in a spatial relationship with each other such that first and second flat surfaces 213 and 221 remain at a predetermined angle to each other—namely, parallel with each other. Bars 231 at one end are rotatably fastened to blocks 210 and 220 by pins 232 and 233, respectively. Bars 234 at the other end are correspondingly rotatably fastened to blocks 210 and 220 by similar pins, not shown. Linkage 230 allows block 210 to move with respect to block 220 in the direction of arrow 237 in FIGS. 3 and 4. However, the linkage constrains this motion such that surfaces 213 and 221 always remain parallel to each other, and thus surface 112 of card 110 is always held parallel to side 121 of connector 120, regardless of variations in the thickness of connector 120 and card 110.

The process of manufacturing assembly 100 is as follows:

First, connector 120 is pushed along (i.e., parallel to) flat surface 221 of block 210, in the direction of arrow 201 in FIGS. 2 and 3, so that spring clips 222 hold it against surface 221 with one side 121 parallel thereto. Upper portions 125 of all contacts 122 have previously been tinned with solder.

Next, circuit card 110 is pushed parallel to surfaces 213 of block 210, again in the direction of arrow 201, until portions 114 of conductors 111 slide into contact with tinned portions 125 of contacts 122 in connector 120. Conductor portions 114 have also been tinned with solder. At this stage, spring clips 214 hold card 110 against flat surfaces 213 such that one surface 112 is held parallel to side 121 of connector 120.

Then, holder 200 and the assembled components 110 and 120 are all heated so as to solder bond card 110 to connector 120 such that the mechanical strength of the bonds will thereafter hold the card and connector in the desired fixed relation to each other. Preferably, this is accomplished with a vapor-phase reflow process. In this process, the card, connector, and holder are all inserted into a furnace containing boiling fluorocarbon or other vapors having a temperature (e.g., 215° C.) greater than the melting point of the solder used to tin conductors 114 and contacts 125. Condensation of the vapor on this assembly melts the solder and thereby forms a solder bond between all of the card conductors 114 and their corresponding connector contacts 125. Other types of soldering processes may also be employed as well.

Next, the holder and assembled components are cooled below the melting temperature of the solder used, so that card conductors 114 are bonded mechanically as well as electrically to connector contacts 125. The now bonded assembly 100 is then removed from holder 200 by pulling it parallel to surfaces 213 and 221, in a direction opposite arrow 201. Thereafter, the strength of the soldered conductors is sufficient to maintain the parallelism between card surface 112 and connector side surface 121 in normal use.

What is claimed is:

1. A method for assembling a connector having a flat side to a circuit card having a flat side such that said flat sides have a fixed angle with respect to each other, said method comprising:
    holding said connector flat side against a first flat surface with a first spring means mounted on said first block so as to orient said connector flat side parallel to said first flat surface;
    holding said circuit card flat side against a second flat surface with a second spring means mounted on said second block so as to orient said circuit-card flat side parallel to said second flat surface;
    mating said connector to said circuit card with a parallel linkage attached between said first and second blocks for maintaining a spatial relationship between said blocks such that said circuit card remains in a predetermined position with respect to said connector with said connector flat side at said fixed angle to said circuit-card flat side despite dimensional variations in said connector and said circuit card in a direction perpendicular to said flat sides;
    forming a bond between said connector and said circuit card while they are so mated, so as to produce a rigid assembly of said connector and said circuit card.

2. A method according to claim 1, wherein said bond is a solder bond between electrical conductors on said connector and electrical conductors on said circuit card.

3. A method according to claim 1, wherein said conductors are tinned, and said forming steps comprises heating said connector and said circuit card past the melting temperature of said solder while said connector and said circuit card are so mated.

4. A method according to claim 3, comprising the further steps, after said heating step, of:
    cooling said assembly below the melting point of said solder;
    releasing said assembly from said flat surfaces.

* * * * *